ELECTRICAL CONNECTOR HAVING A RESILIENT CONDUCTOR-ENGAGING AREA

Original Filed April 5, 1965

INVENTOR.
GLENWOOD ARTHUR FULLER
KENNETH LEON WHITMOYER
BY Curtis, Morris & Safford United States Patent Office Re. 26,994
Reissued Dec. 1, 1970

26,994

ELECTRICAL CONNECTOR HAVING A RESILIENT CONDUCTOR-ENGAGING AREA

Glenwood Arthur Fuller, Bloomington, Ill., and Kenneth Leon Whitmoyer, Camp Hill, Pa., assignors to AMP Incorporated, Harrisburg, Pa.

Original No. 3,288,914, dated Nov. 29, 1966, Ser. No. 445,352, Apr. 5, 1965. Continuation of application Ser. No. 785,825, Nov. 22, 1968. Application for reissue Aug. 19, 1969, Ser. No. 852,981

Int. Cl. H01r *9/06;* H02g *15/08*

U.S. Cl. 174—84 4 Claims

Matter enclosed in heavy brackets [ ] appears in the original patent but forms no part of this reissue specification; matter printed in italics indicates the additions made by reissue.

*ABSTRACT OF THE DISCLOSURE*

*An electrical connector comprises a conductive tubular member having three equally-spaced spring projections provided with free ends extending away from an insertion end of the tubular member. The spring projections have a wedge-shaped configuration with the free ends being of less width than the width of the opposite ends and the free ends are directed toward and disposed adjacent each other to define a normal conductor-engaging area having a substantially triangular configuration disposed in a plane substantially normal to a longitudinal axis of the tubular member to provide uniform engagement pressure on an electrical conductor means when it is placed within the conductor-engaging area with the free ends of the spring projections biting into the electrical conductor means upon the electrical conductor means being moved in a direction opposite to its direction of insertion to provide a mechanical and electrical connection.*

*This application is a continuation of application Ser. No. 785,825, filed Nov. 22, 1968, now abandoned.*

This invention relates to an electrical connector and more particularly to an electrical connector of the type to electrically engage the conductive portion of an insulated conductive means.

It is an object of the invention to provide an electrical connector having means to penetrate the insulation and engage the conductive portion of an insulated conductive means.

It is another object of the invention to provide an electrical connector in which the means to penetrate the insulation and engage the conductive portion of a conductive means is defined by inwardly directed and aligned spring projections.

An additional object of the invention is the provision of a stop means in the electrical connector.

A further object of the invention is the provision of insulating and sealing means for the electrical connector.

Other objects and attainments of the present invention will become apparent to those skilled in the art upon a reading of the following detailed description when taken in conjunction with the drawings in which there is shown and described an illustrative embodiment of the invention it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are achieved in the present invention through the provision of an electrical connector construction wherein the electrical connector has a tubular configuration including a stop means and inwardly directed spring projections which are spaced inwardly from at least one end of the tubular member, the spring projections are directed away from the ends of the tubular member and the inner ends of the spring projections are disposed in a plane normal to the axis of the tubular member so that upon insertion of an insulated conductive means into the tubular member, the end of the conductive means engages the inwardly directed spring projections causing them to be bent in an outwardly direction thereby allowing the insulated conductive means to pass readily thereby until the end of the conductive means engages the stop means. After the end of the conductive means has come into contact with the stop means, force is applied to the conductive means causing the inner ends of the spring projections to penetrate through the insulation and electrically engage the conductive portion of the insulated conductive means. An insulating and sealing means is disposed on the electrical connector and it snugly engages the insulated conductive means after the conductive means has been disposed in the electrical connector.

Figure 1:
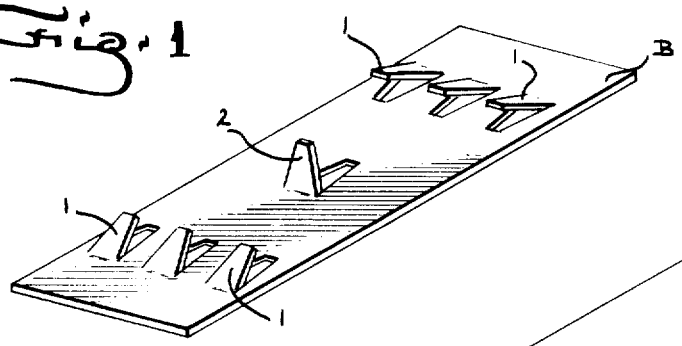
FIGURE 1 is a perspective view of the present invention in blank form prior to being formed into an electrical connector.
Figure 2:
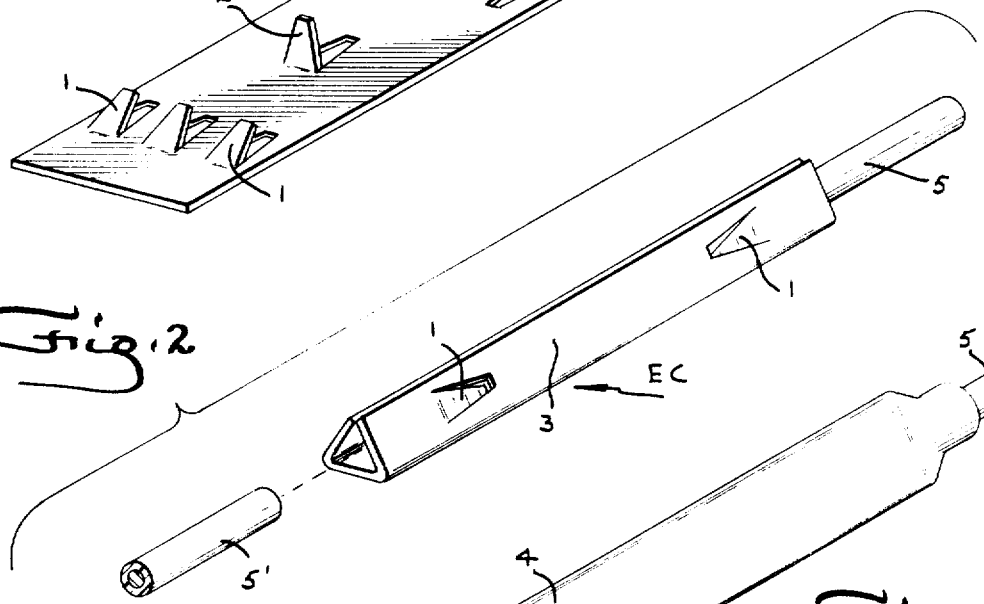
FIGURE 2 is an exploded perspective view of the electrical connector with one insulated conductive means disposed therein and another insulated conductive means exploded therefrom.

Turning now to the drawings, there is illustrated in FIGURE 1 a blank B prior to being formed into an electrical connector and having aligned spring projections 1 struck outwardly therefrom proximate each end thereof and a single projection 2 disposed about centrally of the blank. Spring projections 1 at each end of blank B are disposed toward projection 2 at an acute angle; the spring projections are wedge-shaped so that the free ends of the projections are not as wide as the parts where they integrally merge with blank 1. Projection 2 is disposed normal to blank B, and it preferably has a configuration similar to that of projections 1. Blank B is then formed into a triangular configuration as illustrated in FIGURE 2 to from electrical connector EC defining a tubular member 3 having each side provided with inwardly directed wedge-shaped spring projections 1 proximate each end. The base of tubular member 3 as illustrated contains projection 2 which acts as a stop means.

The connector is susceptible to mass production by automatic machinery and is conveniently formed by shaping a sheet metal blank or strip of a suitable electrically conductive material in successive forming steps. The metal is sufficiently hard and resilient to impart to the spring projections a spring-like character to enable them to effectively engage the conductive portions of insulated conductive means and retain them within the electrical connector.

Figure 5:
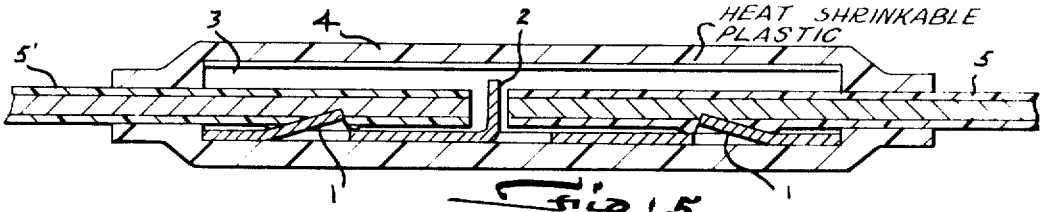
FIGURE 5 is a longitudinal cross-sectional view of FIGURE 3.
Figure 6:
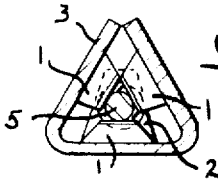
FIGURE 6 is a view taken along lines 6—6 of FIGURE 4.

The free ends of spring projections are disposed in a plane normal to the axis of tubular member 3 and define a conductive engaging area similar in configuration as that of tubular member 3 as illustrated in FIGURE 6. Therefore, as can be discerned from FIGURES 2 and 4 through 6, spring projections 1 in each portion of the electrical connector are disposed in a direction away from the ends of the electrical connector which is in the direction of insertion of the insulated connector means into the electrical connector, the spring projections are directed toward the axis of the electrical connector at an acute angle with respect to the sides from which they extend and the free ends of the spring projections are disposed in planes normal to the axis of the electrical connector which defines a conductor-engaging area that centers the conductive means relative to the electrical connector. Since the free ends of projections 1 are relatively close to each other at the conductor receiving area, the electrical connector of the present invention is capable of receiving therein a wide range of sizes of conductive means therein.

An insulating and sealing means 4 is disposed on tubular member 3 in order to provide insulation for the electrical connector, and, as can be discerned, the ends of insulating and sealing means 4 extend outwardly beyond electrical connector EC to snugly engage insulation of the insulated conductor means for disposition within the conductor-engaging areas of the electrical connector. Insulating and sealing means 4 is preferably made from shrinkable plastic in order to snugly engage the electrical connector as well as the insulation of the insulated conductive means upon the application of heat thereto.

Figure 4:
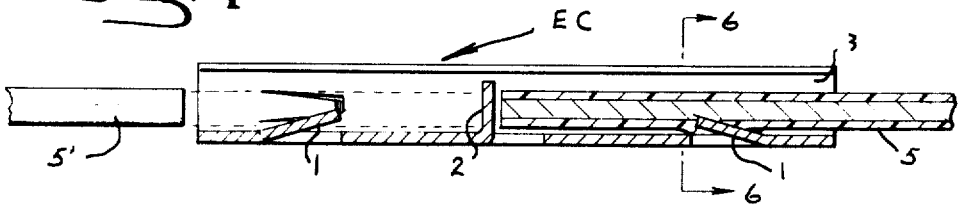
FIGURE 4 is a longitudinal cross-sectional view of FIGURE 2.

In operation, an unstripped end of insulated conductive means 5 is pushed into one end of tubular member 3 beyond the free ends of spring projections 1 until it engages stop means 2. As the conductive means passes by spring projections 1, they are cammed outwardly toward their respective surfaces of the tubular member. After the end of conductive means 5 has engaged stop means 2, a force is applied to the conductive means in a direction opposite to the insertion of the conductive means within the tubular member causing the free ends of the spring projections to penetrate through the insulation of the conductive means and electrically engage the conductive portion thereof as illustrated in FIGURES 4 through 6. The inner edges of the free ends of spring projections are sharp so as to readily penetrate through the insulation of the conductive means, and, when the sharp edges of the spring projections engage the conductive portion of the conductive means, the outwardly directed force causes them to bite into the conductive portion causing the conductive means to be secured within the tubular member.

Since the free ends of the spring projections apply a substantially uniform pressure onto the conductive portion of the conductive means, the conductive means is readily secured within the tubular member and can withstand a tensile approaching the strength of the conductive means. An insulated conductive means 5' is inserted into the other end of tubular member 3 and the same procedure as outlined herein above is followed in order to secure this conductive means therewithin.

Figure 3:
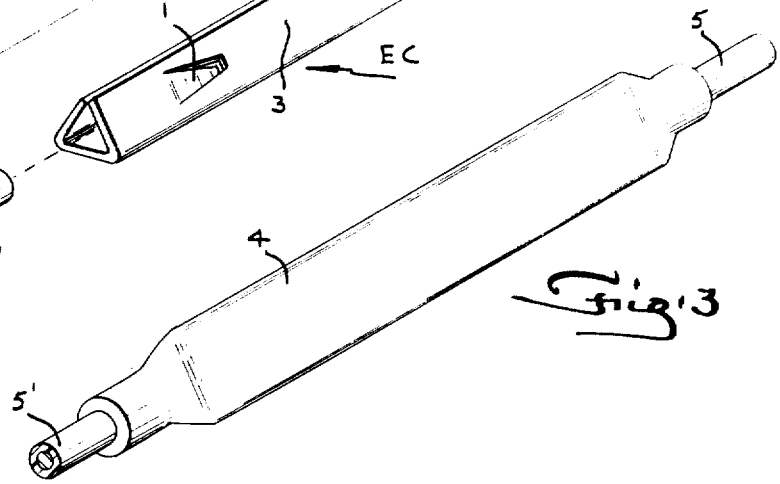
FIGURE 3 is a perspective view of the electrical connector with insulated conductive means disposed therein and insulating and sealing means snugly engaging the connection.

As illustrated in FIGURES 3 and 5, insulating and sealing means 4 is disposed on the electrical connector so as to provide insulation therefor as well as to snugly engage the insulation of insulated conductive means 5, 5' and to provide an effective seal to prevent moisture or contaminating objects to effect the electrical connection between the electrical connector and the insulated conductive means.

Instead of the electrical connector having insulation penetrating and conductive portion engaging means in both sections of the tubular member, only one section of the electrical connector may be provided with the insulation penetrating and conductive portion engaging means while the other section may be a means to connect the connector to a terminal. If desired, the ends of the conductive means may be stripped prior to being inserted within the electrical connector and an effective mechanical and electrical connection will still be attainable therebetween. While only three spring projections 1 are disclosed in alignment on each side of stop means 2, other aligned spring projections may, of course, be provided on each side of the stop means as desired. Configurations of tubular members 3 other than the configuration illustrated may be utilized such as, for example, rectangular, pentangular, etc. The electrical connector may have as many sections as desirable with each including aligned spring projections 1 to interconnect as many electrical leads.

As can be discerned, there has been disclosed a unique electrical connector having inwardly directed and aligned spring projections which penetrate the insulation of an insulated conductive means if the insulation has not been stripped therefrom, and the spring projections mechanically and electrically engage the conductive portion of the conductive means as well as secure the conductive means within the electrical connector; the electrical connector is provided with an insulating and sealing means to provide insulation for the electrical connector and ends of the insulating and sealing means extend beyond the ends of the electrical connector to snugly engage the insulation of the insulated conductive means to provide an effective seal therebetween.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. In a connector of the type described, a conductive tubular member having at least three sides, spring projections disposed in each side of said tubular member and including free ends extending away from an end of said tubular member, said spring projections having a truncated *wedge-shaped* configuration with said free ends being of less width than the width of opposite ends integrally connected to said sides, said free ends being directed toward each other and being disposed adjacent each other to define a common conductor-engaging area disposed in a plane substantially normal to a longitudinal axis of said tubular member, said conductor-engaging area defining a configuration similar to that of said tubular member to provide uniform engagement pressure on an electrical conductor means when placed within said conductor-engaging area with the free ends of the spring projections biting into the electrical conductor means upon the electrical conductor means being moved in a direction opposite to its direction of insertion to provide a mechanical and electrical connection.

2. In a connector according to claim 1 wherein insulation and sealing means is disposed on said tubular member to insulate said tubular member and includes an end extending beyond a respective end of the tubular member to sealingly engage the conductor means secured in the conductor-engaging area of said tubular member.

*3. In a connector of the type described, a conductive tubular member, three spring projections disposed in said tubular member in substantially equally-spaced relation to one another and including free ends extending away from an end of said tubular member, said spring projections having a truncated wedge-shaped configuration with said free ends being of less width than the width of opposite ends integrally connected to said tubular member, said free ends being directed toward each other and being disposed adjacent each other to define a common conductor-engaging area disposed in a plane substantially normal to a longitudinal axis of said tubular member, said conductor-engaging area defining a substantially triangular configuration to provide uniform engagement pressure on an electrical conductor means when placed within said conductor-engaging area with the free ends of the spring projections biting into the electrical conductor means upon the electrical conductor means being moved in a direction*

*opposite to its direction of insertion to provide a mechanical and electrical connection.*

*4. In a connector according to claim 3, wherein insulation and sealing means is disposed on said tubular member to insulate said tubular member and includes an end extending beyond a respective end of the tubular member to sealingly engage the conductor means secured in the conductor-engaging area of said tubular member.*

References Cited

The following references, cited by the Examiner, are of record in the patented file of this patent or the original patent.

UNITED STATES PATENTS

| | | | |
|---|---|---|---|
| 1,568,585 | 1/1926 | Brune | 174—84 |
| 2,291,434 | 7/1942 | Hollopeter et al. | 174—90 |

FOREIGN PATENTS

| | | |
|---|---|---|
| 878,993 | 10/1961 | Great Britain. |

DARRELL L. CLAY, Primary Examiner

U.S. Cl. X.R.

29—628; 339—97